United States Patent [19]

Stratta et al.

[11] Patent Number: 5,480,928
[45] Date of Patent: Jan. 2, 1996

[54] PREPARATION OF STABLE DISPERSIONS OF ETHYLENE OXIDE POLYMERS

[75] Inventors: Julius J. Stratta, New City, N.Y.; Julian K. Rose, South Charleston; Herbert J. Paxton, Jr., Elkview, both of W. Va.

[73] Assignee: Union Carbide Chemicals & Plastics Technology Corporation, Danbury, Conn.

[21] Appl. No.: 203,876

[22] Filed: Dec. 1, 1971

[51] Int. Cl.⁶ .............................. C08K 5/05; C08K 5/06; B05D 5/08; C08L 71/02

[52] U.S. Cl. .................. 524/386; 137/13; 252/315.1; 252/315.6; 523/175; 524/377; 524/612; 524/923; 528/413

[58] Field of Search .................. 260/33.2 R, 33.4 R, 260/34.2; 523/175; 524/376, 386, 923, 377; 528/413

[56] References Cited

U.S. PATENT DOCUMENTS

| | | | |
|---|---|---|---|
| 2,937,156 | 5/1960 | Berry | 260/34.2 X |
| 3,634,303 | 1/1972 | Vandenberg | 260/34.2 X |
| 3,736,288 | 5/1973 | Stratta et al. | 523/175 |

*Primary Examiner*—Richard D. Lovering
*Attorney, Agent, or Firm*—W. K. Volles

[57] ABSTRACT

A process for producing a stable dispersion of ethylene oxide polymer which comprises contacting (a) a slurry of granular ethylene oxide polymer in a first inert normally-liquid hydrocarbon diluent, with (b) a second inert, normally-liquid organic diluent such as propylene glycol, and (c) a suspending agent, e.g., silica, (d) under agitation which is sufficient to provide intimate mixing of said ethylene oxide polymer and said suspending agent with said second diluent; and (e) recovering a stable dispersion comprising particulate ethylene oxide polymer and suspending agent in said second diluent.

7 Claims, No Drawings

PREPARATION OF STABLE DISPERSIONS OF ETHYLENE OXIDE POLYMERS

Ethylene oxide polymers which have a reduced viscosity value of at least about one can be produced by polymerizing the appropriate monomeric feed in the presence of an extremely wide variety of prior art epoxy polymerization catalysts. Such polymers which are typified by poly(ethylene oxide), ethylene oxide/propylene oxide copolymer, and the like, are hard, tough, horny materials which have a host of recognized utilities, e.g., as hydrodynamic drag reducing agents, binders, sizes, coagulants, thickeners, etc. By conducting the polymerization reaction in the presence of an inert, normally-liquid organic diluent in which said monomeric feed is soluble and in which the resulting ethylene oxide polymer is insoluble, there can be obtained granular ethylene oxide polymers as a slurry in the polymerization diluent. This route will hereinafter be referred to as the "suspension polymerization process".

The term "granular", as used herein, refers to the ethylene oxide polymers which are produced by the suspension polymerization process. Such granular polymers are characterized by wide fluctuations in particle size distribution notwithstanding the fact that a majority of their weight will pass through a 20 mesh screen (U.S. Sieve Numbers). Moreover, once these granular polymers are dried the particle size distribution becomes even more pronounced due to the formation of polymer aggregates. Such undesirable fluctuation in the granular polymer particle size distribution (from lot to lot and even within a common lot) is a significant cause for the erratic handling characteristics, dissolving rates, and efficiencies these polymers exhibit when used in applications involving the reduction of hydrodynamic drag.

A disadvantage of the suspension polymerization route is the need to dry the granular ethylene oxide polymer prior to shipping the same to the customer. One method involves the use of a silo-like tower which contains a plurality of spaced trays. Nitrogen is introduced at the base of the tower whereas the wet granular polymer is introduced at the top. In this manner circulating nitrogen gas flushes out entrained or residual organic diluent contained in the granular polymer. The dried granular polymer then can be bagged or containerized and shipped to the customer. Obviously, the drying procedure represents an added expense to the manufacturer. A further problem attendent with the drying operation, as indicated previously, is the formation of polymer aggregates.

Customers of dried granular ethylene oxide polymers often times "tailor-formulate" dispersions of such polymers in an inert liquid media for specific end uses, especially applications in which the reduction of hydrodynamic drag plays a significant role as in the transport of water through a conduit or in the propulsion of towing of a vessel. Dispersions formulated from such ethylene oxide polymers quite often exhibit undesirable variations and fluctuations in physical properties, e.g., stability, fluidity, active polymer loading capacity, hydrodynamic drag reducing efficiency, etc. Consequently, the formulator is compelled to undertake time-consuming and costly corrective measures to obtain polymer dispersion consistency and uniformity.

To obtain a more uniform and finer polymer particle size distribution, it is well known that the polymer must first be rendered into a brittle state, that is to say, the grinding or reduction operation must be conducted below the glass transition temperature of the polymer. For solid poly(ethylene oxide) having an average molecular weight of at least about 100,000, the glass transition temperature is approximately $-55°$ C. Hence, it has been the practice of the prior art to cool granular poly(ethylene oxide) with dry-ice and/or liquid nitrogen in order to effect the grinding or dispersion operation at an appreciable rate. Grinding above the glass transition temperature is inefficient since the physical characteristics of poly(ethylene oxide) is rubbery and, as such, the polymer absorbs mechanical energy. If such absorption of energy raises the temperature of the polymer above its melting point, then it will fuse and cease to be in free-flowing particle form. Additionally, the increase in the threshold of energy which is required to reduce the polymer aggregates can result in appreciable molecular weight degradation of the polymer.

At this time, it is deemed advisable to define various terms generally used by those skilled in the art of drag reduction. The term "hydrodynamic drag reduction", as used herein, is the increase in the volumetric flow rate of water at a constant pressure drop due to the addition, usually of a small amount, e.g., a couple of hundred ppm or less, of a solid linear, polymeric material of relatively high molecular weight. Such material is known as the "hydrodynamic drag reducing agent" or more commonly, the "active polymer". The term "hydrodynamic drag reducing efficiency" (for brevity, oftentimes referred to as "efficiency"), described hereinafter more completely, represents the percent increase in the flow of treated tap water (contains the hydrodynamic drag reducing agent) relative to the flow rate of untreated tap water (lacks the hydrodynamic drag reducing agent).

Dispersions of active polymer in inert media which are to be used primarily in the field of hydrodynamic drag reduction should possess various desirable characteristics, for example, good handling features such as fluidity, pumpability, and/or pourability; high hydrodynamic drag reduction efficiency; good shelf-life undiminished by stratification or any appreciable degradation of the dispersed active polymer over extended periods of time; capability of accepting high loads of the active polymer dispersed therein; and other factors.

To obtain dispersions comprising active polymer which possess the afore-illustrated desirable characteristics, the formulator oftentimes has to resort to costly and time-consuming measures. The disadvantages attendant with the grinding operation of the active polymer referred to previously are manifest. In lieu of grinding, the formulator may possibly vary the composition of the components comprising the dispersion. At best, this approach has met with limited success. To insure stratification resistance of the prior art slurries or dispersions, the formulator is forced to prepare formulations which exhibit high gel strengths. This is an obvious disadvantage since the handling characteristics, e.g., pourability, fluidity, and pumpability, are adversely affected.

Accordingly, one or more of the following objects will be achieved by the practice of this invention.

It is an object of the invention to provide a novel process for the preparation of dispersions of ethylene oxide polymer which possess good handling characteristics such as fluidity, pumpability, and pourability; improved hydrodynamic drag reduction efficiency; good shelf-life undiminished by stratification or any appreciable degradation of said ethylene oxide polymer over extended periods of time; and/or the capability of accepting high loads of dispersed polymer therein. It is another object of the invention to provide a novel process for the manufacture of "tailor-made" dispersions of ethylene oxide polymer which have a high degree of utility as hydrodynamic drag reducing agents. A further object of the invention is to provide a novel direct and practical process for producing stable dispersions comprising particulate ethylene oxide polymer in an inert diluent of choice. A yet further object of the invention is to provide a novel process in which improved dispersions comprising ethylene oxide polymer can be prepared at substantial savings in cost. These and other objects of the invention will become apparent to those skilled in the art in the light of the specification.

By practice of the invention there is provided a novel process which comprises contacting (a) a slurry of granular ethylene oxide polymer in a first inert normally-liquid organic hydrocarbon diluent; with (b) a second inert, normally-liquid organic diluent (i) which is a non-solvent for said granular ethylene oxide polymer, (ii) which has a boiling point higher than said first hydrocarbon diluent, and (iii) which is composed of carbon, hydrogen, and oxygen atoms, said oxygen atoms being of the group consisting of alcoholic hydroxylic oxygen, aliphatic etheric oxygen, and mixtures thereof; and (c) a suspending agent which is non-reactive with said ethylene oxide polymer, said first diluent, and said second diluent; (d) under agitation which is sufficient to provide intimate mixing or wetting of said ethylene oxide polymer and said suspending agent with said second diluent; and (e) recovering a stable dispersion comprising particulate ethylene oxide polymer and suspending agent in said second diluent.

Most desirably, the novel process utilizes the slurry of granular ethylene oxide polymer as formed by the suspension polymerization route. In one aspect of the invention, therefore, there is provided a direct process in which the granular ethylene oxide polymer contained in the inert suspension polymerization diluent is subjected to a series of steps whereby there is obtained a stable dispersion of particulate ethylene oxide polymer in a different inert diluent of choice. It is to be understood, however that the novel process is not necessarily limited to ethylene oxide polymer slurries which result from the suspension polymerization route, but rather, to granular ethylene oxide polymer slurried in any inert, normally-liquid hydrocarbon diluent which is not a solvent for said polymer.

The process for preparing granular ethylene oxide polymers slurried in an inert normally-liquid hydrocarbon diluent is well documented in the prior art, e.g., note U.S. Pat. Nos. 2,941,963, 2,969,402, 3,037,943, 3,062,755, and 3,167,519. Such catalyzed processes involve polymerizing the appropriate monomeric feed comprising ethylene oxide or mixtures comprising ethylene oxide and polymerizable olefin monoxide comonomers illustrated hereinafter, in the presence of an inert normally-liquid organic hydrocarbon diluent in which said monomeric feed is soluble and in which the resulting ethylene oxide polymer is insoluble, under agitation, while maintaining the reaction temperature in the range of from about −30° C. to below about the melting point of the resulting ethylene oxide polymer, whereby there is produced granular ethylene oxide polymer product slurried in the inert hydrocarbon diluent.

Illustrative inert normally-liquid hydrocarbon diluents include the normally-liquid straight and branch chain saturated acyclic and cyclic hydrocarbons, petroleum fractions, etc., e.g., pentane, hexane, heptane, octane, nonane, decane, dodecane, cyclopentane, cyclohexane, cycloheptane, cyclooctane, lower-alkyl substituted alkanes and cycloalkanes, decahydronaphthalene, naphtha, mineral oil, mixtures thereof, and the like.

The proportions of granular ethylene oxide polymer to the inert hydrocarbon diluent is not critical and can vary over an extremely wide range. For instance, as a lower limit, sufficient inert hydrocarbon diluent should be present to thoroughly wet the granular ethylene oxide polymer. The upper concentration limit is dictated by economics and practicality since slurries of granular polymer can be formed using infinite amounts of inert hydrocarbon diluent. In general, a slurry which comprises from about 2 to about 98 weight percent, and desirably from about 5 to about 95 weight percent, granular ethylene oxide polymer, based on the total weight of polymer and hydrocarbon diluent is suitable in the practice of the invention.

The granular ethylene oxide polymer slurried in a first inert normally-liquid hydrocarbon diluent, in accordance with the novel process, is then thoroughly mixed under agitation with (a) a second inert, normally-liquid organic diluent (i) which is a non-solvent for said granular ethylene oxide polymer, (ii) which has a boiling point higher than said first hydrocarbon diluent, and (iii) which is composed of carbon, hydrogen, and oxygen atoms, oxygen atoms being of the group consisting of alcoholic hydroxylic oxygen, aliphatic etheric oxygen, and mixtures thereof, and (b) a suspending agent which is non-reactive with said ethylene oxide polymer, said first diluent, and said second diluent. The order of mixing the aforesaid slurry, second diluent, and suspending agent is not critical. Desirably, the suspending agent can be added to the second diluent, under agitation, and then the resulting admixture of second diluent and suspending agent can be added to the slurry or these sequence of steps can be reversed. The agitation should be sufficient to effect intimate mixing or wetting of the ethylene oxide polymer with the second diluent. Desirably, agitation is carried out with sufficient power necessary to continually mix the system in spite of appreciable viscosity changes that take place as the first diluent is removed and as polymer aggregates are changing dimension. The resultant intensity of mixing is sufficient to dissociate polymer aggregates into smaller sizes without any significant polymer degradation effects. Oftentimes, agitation which subjects the polymer to a shear stress of at least 10 dynes/centimeter$^2$ can be employed to effect sufficient mixing of the major components. The mixing or agitation period can vary from several minutes to several hours, e.g., from five minutes, or less, to about 10 hours, and longer. The mixing period depends, to a significant extent, on the degree of agitation employed, the size of the mixing vessel, the concentration of the polymer, the polymer particle size distribution, and other factors. The mixing temperature is preferably conducted below the melting point of ethylene oxide polymer in order to prevent the formation of polymer aggregates or fusion of the polymer particles. For instance, in the case of granular ethylene oxide homopolymer, the mixing temperature is effected below approximately 60° C. Most conveniently, agitation can be accomplished at ambient room temperature, e.g., about 20° C.

Oftentimes during the afore-described agitation step, the formation of two liquid phases begins to take shape. One phase comprises predominantly the first inert hydrocarbon diluent and the other phase comprises the second inert diluent including polymer and suspending agent. In one technique, the hydrocarbon phase can be incrementally withdrawn during the mixing step. Alternatively, the cessation of the mixing step produces two distinct phases of the nature described above. These phases are readily separated as by decantation, filtration, extraction, molecular sieves, and other separation means well recognized by those skilled in such art. The removal of residual amounts of hydrocarbon diluent from the second inert diluent phase comprising polymer and suspending agent can be accomplished in any known manner, for example, by distillation under reduced pressure.

By practice of the novel process, there can be prepared formulations which can be varied in appearance from pourable dispersions to pasty solid dispersed concentrates comprising ethylene oxide polymer. Within these illustrated extremes there exists, among others, pourable thixotropic dispersions. These dispersed systems exhibit a highly favorable balance of properties and characteristics. For instance, these dispersions comprising particulate ethylene oxide polymer are characterized by improved handling characteristics; e.g., fluidity, pumpability, and/or pourability, even at extremely high polymer concentrations; by high resistance to stratification and molecular weight degradation of the polymer over extended periods of time, e.g., several months; and by high efficiencies when employed as hydrodynamic drag reducing agents. By the practice of the invention, there can be formulated stable dispersions which exhibit uniformity and homogeneity with regard to polymer particle size distribution in an inert diluent of choice. Such dispersions can contain from about one, and lower, to about 60, and higher, weight percent, suitably from about 5 to about 55 weight percent, of particulate ethylene oxide polymer (based on the total weight of polymer and diluent) in which greater than about 95 weight percent, oftentimes about 98–99 weight percent, will pass through a 20 mesh screen. Moreover, these advantages are accomplished by a novel direct process in which little, if any, appreciable molecular weight degradation of the ethylene oxide polymer is manifest. Of course, the novel process is not to be construed as being limited to the aforementioned polymer particle sizes since larger or finer particles of ethylene oxide polymer can be prepared, for example, by controlling the degree and time period during the agitation step.

Illustrative of granular ethylene oxide polymers which are suitable in the practice of the invention include homopolymers of ethylene oxide and copolymers comprising ethylene oxide and a different olefin monoxide copolymerizable therewith. Desirably, the ethylene oxide polymers are water-soluble. The olefin oxide, as polymerizable comonomers, have a sole vicinal-epoxy group,

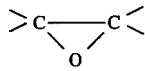

group, and they are illustrated by 1,2-propylene oxide, 2,3-butylene oxide, 1,2-butylene oxide, styrene oxide, 2,3-epoxyhexane, 1,2-epoxyoctane, butadiene monoxide, cyclohexene monoxide, epichlorohydrin, and the like. Illustrative water-soluble ethylene oxide polymers include poly(ethylene oxide) and copolymers comprising ethylene oxide with minor amounts of propylene oxide, butylene oxide, and/or styrene oxide, for example, copolymers which contain upwards to about 25 weight percent of the olefin oxide comonomer. It should be noted that the term "copolymer" is used in its generic sense, that is, a polymer formed via the polymerization of two or more polymerizable monomers. Poly(ethylene oxide) and copolymers of ethylene oxide with propylene oxide are preferred. From standpoints of price, commercial availability, performance and effectiveness for use as a hydrodynamic drag reducing agent, poly(ethylene oxide) is the polymer of choice.

The granular ethylene oxide polymer has an average molecular weight greater than about 100,000, desirably from about 500,000 to about 12,000,000, and preferably from about 1,000,000 to about 8,000,000 especially when the contemplated application is for use as agents in the reduction of hydrodynamic drag of turbulent water. In general, the granular ethylene oxide polymer oftentimes has a particle size distribution of which at least about 50 weight percent passes through a 20 mesh screen. However, it is to Be understood that in the practice of the novel process the granular ethylene oxide polymer particle size distribution is not narrowly critical and can vary over a wide range.

The second inert normally-liquid organic diluent, i.e., the displacing diluent, as indicated previously, (i) is a nonsolvent for the granular ethylene oxide polymer, (ii) has a boiling point higher than the first hydrocarbon diluent (the diluent to be displaced), and (iii) is composed of carbon, hydrogen, and oxygen atoms, said oxygen atoms being of the group consisting of alcoholic hydroxylic oxygen (—OH), aliphatic etheric oxygen (—O—), and mixtures thereof. By the term "alcoholic hydroxylic oxygen", as used herein, is meant oxygen in the form of a hydroxyl group which group is monovalently bonded to an aliphatic or cycloaliphatic carbon atom. Desirably, the second diluent is water-miscible. Illustrative of said normally-liquid diluents include alkanepolyols and oxaalkanepolyols as exemplified by propylene glycol, 1,3-butylene glycol, 1,4-butylene glycol, 1,6-hexylene glycol, ethylene glycol, 2-methylpentane-2,4-diol, octane-1,2-diol, dodecanediol, diethylene glycol, dipropylene glycol, dibutylene glycol, glycerol, erythritol, pentaerythritol, 1,1,1-trimethylolethane, 1,1,1- trimethylolpropane, and the like; the polyoxyalkylene glycols such as the polyoxyethylene glycols, the polyoxypropylene glycols, the mixed polyoxyethylene-oxypropylene glycols, and the like; the mono-lower alkyl and/or di-lower alkyl ethers of ethylene glycol, of propylene glycol, of butylene glycol, of diethylene glycol, of dipropylene glycol, of dibutylene glycol, and of higher polyoxyalkylene glycols illustrated previously, especially those which have average molecular weights upwards to about 3000; and mixtures of the above. The alkanepolyols especially the alkanediols which have up to ten carbon atoms are preferred. Propylene glycol is the diluent of choice since its $LD_{50}$ value is 26.3 whereas the $LD_{50}$ value of, for example, polyoxypropylene glycol (of about 400–425 average molecular weight) is about 2.5. Propylene glycol is "generally recognized as safe" (GRAS) for use in foods intended for human consumption and is widely used in cosmetics and in medical ointments for skin applications in accordance with the Food, Drug and Cosmetics Act. Such relatively low toxicity and general acceptance by an important agency of the United States government makes dispersions based on propylene glycol, produced in accordance with the novel process, extremely attractive especially in drag reduction applications such as irrigation and fire-fighting which utilize a potable water source without fear of contaminating said potable water source or causing extensive injury or damage to personnel occasioned by spillage, spray, etc., of the propylene glycol-based system.

The expression "$LD_{50}$" as used herein represents the lethal nature of a single oral dosage of grams of organic diluent per kilogram of animal (rat) body weight necessary to kill 50 percent of such animals.

The concentration of the second diluent which is used in the practice of the invention is not narrowly critical. The minimum quantity employed should be sufficient to wet the ethylene oxide polymer. As a practical matter, however, an amount of second diluent is employed so that there results two liquid phases in which the ethylene oxide polymer is contained in the phase represented by the second diluent (the "displacing" diluent). The maximum quantity of second diluent which can be utilized is largely dictated by economics, equipment capacity, and other commercial factors. The novel process is extremely adaptable for forming stable dispersions in which the concentration of the "extracted" ethylene oxide polymer contained in the second diluent can be predetermined. The novel process is thus capable of preparing stable dispersions in which the concentration of the dispersed ethylene oxide polymer can vary, as discussed previously, over an extremely wide range, e.g., stable dispersions in which the concentration of the particle polymer contained in the second diluent can vary from about one to about 60 weight percent, based on the total weight of polymer and second diluent.

The suspending agent which is employed in the novel process is non-reactive with the ethylene oxide polymer, the first diluent, and the second diluent. Small amounts of the suspending agent should have the ability to greatly thicken the second diluent and/or to coat the ethylene oxide polymer thereby preventing stratification of the polymer in the second diluent over extended periods of time. The suspending agents can be exemplified by high molecular weight organic polymers which are soluble in the second diluent; and the organic and inorganic solid materials which are insoluble in the second diluent, which are characterized by high surface areas, e.g., about 100 square meters per gram, and which have the ability to form aggregated structures. The latter materials may often be referred to as thixotropic agents. Examples of typical suspending agents include colloidal silica, colloidal silica-alumina mixtures, chrysotile asbestos, colloidal clays such as montmorillonite, modified clays of the magnesium aluminum silicate mineral types, microcrystalline asbestos, microcrystalline nylon, hydroxypropylcellulose, propylene glycol derivatives of alginic acid, polyvinylpyrrolidone, and others readily apparent to those skilled in the art.

The suspending agents are employed in an amount at least sufficient to retard stratification, over extended periods of time, of the dispersions which are produced in accordance with the novel process. It will be readily appreciated to one skilled in the art that the optimum concentration of suspending agent will be influenced by the intended use of the resulting dispersions, the pumpability and pourability characteristics which are desired, the weight percent ethylene oxide polymer contained in the dispersion, the nature of the suspending agent, and other factors. It is apparent that no hard and fast rule can be set down to fix numerical limits regarding the concentration of suspending agent to be employed in the novel process. Taking into consideration the influences described previously, the concentration of the suspending agent can range from about 0.01 and lower, to about 10, and higher weight percent, based on the total weight of the dispersions produced by the novel process. In general, from about 0.1 to about 7 weight percent suspending agent is suitable.

If desired, other ingredients can be added during the practice of the novel process. These ingredients may be added separately or simultaneously with the second diluent. Alternatively, such ingredients may be added at the termination of the novel process, that is to say, the addition of the ingredients can be to the resulting dispersion of particulate ethylene oxide polymer in the second diluent. Such additional ingredients can be called upon to perform any one of a multiplicity of functions depending upon the intended end use or application of the resulting dispersion comprising ethylene oxide polymer.

Accordingly, the novel process contemplates the preparation of dispersions which have incorporated therein a surfactant. The use of the surfactant results in a dispersed system which is more homogeneous, creamier, of lower viscosity, of less susceptibility to compaction during pumping, easier to dissolve in water, etc., than a formulation lacking such surfactant. The surfactant can be present in amounts ranging upwards to about 3 weight percent, and higher, based on the total weight of the dispersed system; the preferred range being from about 0.001 to about one weight percent. The surfactant can be any compatible agent capable of reducing the surface tension of water by a measurable amount when it is present in water in very small quantities.

Useful surfactants are those which are compatible with the second diluent and which are comprised of a hydrophobic moiety and a hydorphilic moiety. By the term "compatible", as used in the above sense, is meant that the surfactant does not cause the ethylene oxide polymer to precipitate, nor does it form a complex with said polymer. Such surfactants may be cationic, anionic, non-ionic or amphoteric, and they are, in general, characterized by an ability to measurably influence the surface tension of water.

Illustrative of the suitable surfactants which can be employed include the ethoxylated fatty acids of the formula

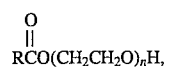

the ethoxylated fatty acid amides of the formula

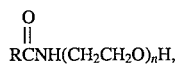

and the alkanolamides of the formulas

and

wherein R is desirably a $C_{10}$–$C_{18}$ alkyl group and wherein n is an integer of 1 to 50; the ethylene oxide condensation products of primary amines of the formula

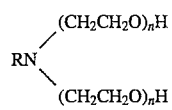

wherein R is desirably a $C_8$–$C_{22}$ alkyl group; the diamines of the formula $RCNHC_3H_6NH_2$ wherein R is desirably a $C_8$–$C_{22}$ alkyl group; the ethylene oxide adducts of alkanols, of alkylphenols, etc., such as those having the formula R$(OC_2H_4)_nOH$ in which n equals 3 to 50 and R represents $C_8$–$C_{18}$ alkyl or $C_8$–$C_{18}$ alkylphenyl; polyethylene glycol ester of tall oil acids; tris(polyoxyethylene) sorbitan monolaurate and monooleate; polyethylene glycol stearate; the hydrolyzable and non-hydrolyzable polysiloxane-polyoxyalkylene block polymers wherein at least one polyoxyalkylene block is joined to at least one polysiloxane block through a Si—C—C bond or a Si—C bond; and the like.

Additional components that can be contained in the dispersions produced by the practice of the invention include stabilizers which are capable of arresting degradation or depolymerization of the ethylene oxide polymer during storage. Such stabilizers may include ultraviolet screening agent, e.g., the benzotriazoles, the phenyl salicylates, etc.; antioxidants such as the phenothiazines, 2-hydroxypropyl-ethylenediamine, thiourea, 2-mercaptomethyl-imidazole, phenyl-alpha-naphthylamine, 2,6-di-t-butyl-4-methylphenol, etc.

If desired, dyes can be incorporated into the dispersions such as Rhodamine B, Alphazurine FGND, fluorescein, vegetable dyes, etc. Any one of many dyes can be employed provided that it is compatible with the other components comprising the dispersion. Other ingredients which can be incorporated, if desired, include corrosion inhibitors designed to protect, for example, metal storage containers from rust and corrosion. Such inhibitors depend, to a large degree, upon the type of metal to be protected. Examples include the phosphate and the borate buffered systems.

The term "hydrodynamic drag reducing efficiency" (hereinafter oftentimes referred to as "efficiency") is measured as the percent increase in the flow of treated tap water (contains the hydrodynamic drag reducing agent, that is, the active polymer) relative to the flow rate of untreated tap water (lacks the hydrodynamic drag reducing agent). The flow rate of the untreated tap water at 30° C.±1° C. (expressed as $F_o$ in the expression below) is set a 10 gallons per minute by maintaining a constant pressure drop of 23.75 psig over the test section of the Turbulent Flow Viscometer. When the hydrodynamic drag reducing agent is injected into the flow of water at 30° C.±1° C., one observes an increase in flow rate when it is measured at a constant pressure of 23.75 psig over the test section of the Turbulent Flow Viscometer. This latter condition represents the flow rate of treated tap water at 30° C.±1° C. and is expressed as $F_t$. The "hydrodynamic drag reducing efficiency" can therefore be calculated from the following:

$$\frac{F_t - F_o}{F_o} = \text{Efficiency (\%)}$$

The "Turbulent Flow Viscometer" consists primarily of a feedwater holding tank and temperature control, a variable speed pump for injection of controlled amounts of the dispersed system of formulation. A turbine flow meter is used to measure flow rates. Pressure losses are measured with pressure gauges and a differential manometer. The test section of tubing over which pressure losses are measured consists of nine stretches of 0.686 inch I.D. (internal diameter) copper tubing connected by 180 degree return bends to give an effective length of about 132 feet. At a pump discharge pressure of 31 psig, water flows at a rate of 10 gallons per minute. When the flow rate of water is increased to 15 gallons per minute, the limitation of the laboratory drain system is reached. The Reynolds number range of the apparatus extends from $2 \times 10^4$ to $8 \times 10^4$, that is, well into the turbulent region. Downstream from the pump but just prior to the test section there is located a point in the piping at which the formulation is injected into the flow of water. The formulation is proportioned by a variable speed syringe pump. Introduction of controlled amounts of the formulation into the flowing water and dissolution therein can be seen through a transparent portion of the piping. Dosage of active polymer is expressed in ppm. Actual dosage levels are calculated from a knowledge of the composition of the formulation and the formulation pumping rates.

The viscosity values of the formulations or systems are reported in centipoises. These values were determined at 25° C. at a constant rate of shear of 1.59 reciprocal seconds. The apparatus employed was a Haake Rotovisco Rotational Viscometer outfitted with the standard MV-III couette or bob and cup assembly operating at the lowest rpm setting of U equals 162. Such a setting corresponds to 3.6 rpm. The MV-III couette system consists of a stationary cup having a diameter of 42 millimeters and a rotating bob having a diameter of 30.4 millimeters and a height of 60.0 millimeters. The viscosity values reported correspond to the lowest value that can be obtained after the system has had essentially all of its thixotropic structure destroyed by exposing the slurry system to a higher shear rate of 259 sec.$^{-1}$ (in which U equals one).

The silica employed as the suspending agent in the Examples hereinafter was fumed colloidal silica which possessed a surface area ranging from about 200 to about 325 square meters/gram, an average particle size of 0.007 micron, and a density of 2.3 pounds/cubic feet (maximum).

The term "ppm" as used herein represents parts of active polymer, e.g., poly(ethylene oxide), per million parts of water.

The term "parts" as used herein signifies parts of weight unless a different meaning is indicated.

In the following illustrative Examples 1–7 infra, the general procedure employed in the preparation of the slurry of granular ethylene oxide polymer was as follows. To a three liter resin kettle equipped with stirrer, temperature monitor, reflux condenser, and inlet and outlet conduits that had previously been purged with dry nitrogen, there was added approximately 2000 milliliters of isopentane/isooctane mixture (first diluent) having a density of 0.661 gram per milliliter. This mixture was sparged with dry nitrogen for approximately 5 minutes. Thereafter, ethylene oxide was added to the kettle until the resulting admixture contained 5 weight percent ethylene oxide monomer. Next, ethylene oxide-acetonitrile modified calcium hexammoniate catalyst prepared in accordance with the procedure set out in U.S. Pat. No. 3,037,943 was added to the kettle. The amount of added catalyst corresponded to 0.5 gram of calcium calculated as the metal. The polymerization reaction was conducted at 31° C. Ethylene oxide was continuously fed to the agitated reaction mixture at a rate so as to maintain (i) a reflux temperature of about 31° C. and (ii) a reaction mixture containing about 5 weight percent ethylene oxide. After a polymerization period of about 6 hours, there was obtained 300 grams of granular ethylene oxide homopolymer (average molecular weight of about 2,500,000) in a slurry volume of 2,300 milliliters.

Thereafter, the procedure employed in Examples 1–6, which represents a preferred mode of the invention, was as follows. Approximately 700 milliliters of the isopentane/isooctane diluent was removed via decantation from the aforesaid slurry. To the resulting concentrated slurry (300 grams of granular polymer) there was added a previously agitated blend of propylene glycol thickened with colloidal silica in amounts so as to achieve predetermined concentrations of a stable dispersion of polymer in propylene glycol (the second diluent). For instance, if it were desired to prepare a dispersion of about 40 weight percent particulate polymer in propylene glycol, 459 grams of thickened propylene glycol were added to the aforesaid slurry.

The resulting admixture of slurry, propylene glycol, and silica (contained in a 3-liter vessel) were thoroughly agitated by high speed propeller means for 15 minutes (Model V7 Lightning Mixer, propeller stirrer and variac control). Two physical changes were noted during the mixing step. There was formed a clear upper liquid phase of isopentane/isooctane that covered a paste-like lower phase comprising polymer, propylene glycol, silica, and lesser amounts of isopentane/isooctane (which continued to rise into the clear upper liquid phase as the mixing continued). The upper phase was removed by decantation. Continued agitation of the lower phase comprising polymer propylene glycol, silica, and residual amounts of isopentane/isooctane transformed the paste-like nature of this phase into a fluid cream. The total mixing time was approximately 3 hours. Residual amounts of the isopentane/isooctane diluent were removed by distillation at reduced pressure, e.g., at 22° C. under 1 mm. of Hg.

The formation of two phases during the mixing step has been observed to occur when the polymerization diluent (isopentane/isooctane mixture in these examples) and the displacing diluent (propylene glycol in these examples) are immiscible. If the two diluents are miscible, then one can resort to other means to resolve the diluents as by distillation under reduced pressure.

In Example 7, the dispersion of polymer in the second diluent was prepared by a prior art two-step technique. Firstly, the granular polymer was separated from isopentane/isooctane suspension polymerization diluent by decantation followed by drying at room temperature by distillation under reduced pressure. This dried polymer was then added, under agitation, to a previously thickened and homogeneous admixture of propylene glycol and silica. Agitation (below about 25° C.) was effected for three hours until a homogeneous dispersion was effected.

EXAMPLES 1–7

A. Seven formulations were prepared according to the procedure noted in the discussion prior to the examples. Examples 1–6 were prepared in accordance with a preferred embodiment of the invention. Example 7 was prepared in accordance with a prior art two-step process. The results and data all are set out in Table I below.

B. The hydrodynamic drag reducing efficiencies of each of the aforesaid formulations were determined with the Turbulent Flow Viscometer described previously at two different dosage levels of active polymer, i.e., poly(ethylene oxide), for each formulation. Other pertinent data are also noted in said Table I below.

Analysis of Examples 1–7 reveals the following. By the practice of the novel process there are obtained dispersions of ethylene oxide homopolymer which exhibit a high order of hydrodynamic drag reducing efficiency. The fluidity of the systems of Examples 5 and 6 are worth noting since they contain high concentrations of dispersed polymer therein, i.e., polymer concentrations of 36.6 and 40.3 weight at viscosities of and 31,600 centipoises, respectively. Moreover, the dispersions of Examples 5 and 6 were stable (resistant to polymer stratification) for periods greater than one year. The dispersion of Example 7, within 6 months, separated into two phases.

By the practice of the invention, there is afforded a direct and economical process in which the granular ethylene oxide polymer is literally "extracted" from the suspension polymerization diluent, i.e., first diluent, and suspended as a stable dispersion of particulate polymer in the "extracting medium", i.e., the second diluent, for extraordinarily long periods. Moreover, by regulating the time and degree of agitation, there can be obtained stable dispersions of polymer in the second diluent in which the majority weight percent of the average polymer particle sizes are as fine as 20 microns and less. The degree of agitation is readily controlled by the operator. Samples of the agitated polymer mixture can be intermittently withdrawn and analyzed by conventional means to achieve the average polymer particle size distribution that is desired for the intended application.

What is claimed:

1. A process for producing a stable dispersion of ethylene oxide polymer which comprises (a) a slurry of granular ethylene oxide polymer in a first inert normally-liquid hydrocarbon diluent, said polymer having an average molecular weight of at least about 100,000; with (b) a second inert, normally-liquid organic diluent (i) which is a non-solvent for said granular ethylene oxide polymer, (ii) which has a boiling point higher than said first hydrocarbon diluent, (iii) which is composed of carbon, hydrogen, and oxygen atoms, said atoms being of the group consisting of alcoholic hydroxylic oxygen, aliphatic etheric oxygen, and mixtures thereof, and (iv) which is selected from the group consisting of propylene glycol, 1,3-butylene glycol, 1,4-butylene glycol, 1,6-hexylene glycol, ethylene glycol, 2-methylpentane-2,4-diol, octane-1,2diol, dodecanediol, diethylene glycol, dipropylene glycol, dibutylene glycol, glycerol, erythritol, pentaerythritol, 1,1,1-trimethylolethane, glycols, polyoxpropylene glycols, mixed polyoxyethylene-oxypropylene glycols, mono-lower alkyl ethers of ethylene glycol, propylene glycol, butylene glycol, diethylene glycol, dipropylene glycol, dibutylene glycol, polyoxyethylene glycols,

TABLE I

| EXAMPLE NUMBER | PEO Wt. % | PROPYLENE GLYCOL, Wt. % | SILICA Wt. % | VISCOSITY CPS at 1.6 sec$^{-1}$ | EFFICIENCY 25 ppm | EFFICIENCY 75 ppm |
|---|---|---|---|---|---|---|
| 1 | 34.0 | 64.4 | 1.6 | 4,570 | 34.5 | 49.8 |
| 2 | 34.4 | 64.1 | 1.5 | 4,990 | 32.0 | 45.0 |
| 3 | 25.0 | 69.0 | 6.0 | 1,250 | 33.2 | 52.5 |
| 4 | 35.1 | 61.9 | 3.0 | 4,570 | 37.1 | 51.3 |
| 5 | 36.6 | 63.4 | 1.2 | 17,500 | 41.3 | 56.6 |
| 6 | 40.3 | 58.5 | 1.2 | 31,600 | 36.2 | 55.1 |
| 7 | 25.0 | 71.5 | 3.5 | 26,000 | 31.0 | 46.0 | and polypropylene glycols, di-lower alkyl ethers of ethylene glycol, propylene glycol, butylene glycol, diethylene glycol, dipropylene glycol, dibutylene glycol, polyoxyethylene glycols, and polypropylene glycols; and (c) a suspending agent which is non-reactive with said ethylene oxide polymer, said first diluent, and said second diluent; (d) under agitation which is sufficient to provide intimate mixing of said ethylene oxide polymer and said suspending agent with said diluent; and (e) recovering a stable dispersion comprising particulate ethylene oxide polymer and suspending agent in second diluent.

2. The process of claim 1 wherein there is formed two phases, one phase comprising said first diluent and a second phase comprising said second diluent, said ethylene oxide polymer, and said suspending agent.

3. The process of claim 1 wherein said ethylene oxide polymer is of the group consisting of poly(ethylene oxide) and ethylene oxide/propylene oxide copolymers.

4. The process of claim 3 wherein said ethylene oxide polymer is poly(ethylene oxide).

5. In a catalytic process for producing granular ethylene polymer which has an average molecular weight of at least about 100,000 which comprises polymerizing a monomeric feed comprising ethylene oxide or mixtures comprising ethylene oxide and polymerizable olefin monoxide comonomers; in the presence of a first inert, normally-liquid hydrocarbon diluent in which said monomeric feed is soluble and in which the resulting granular ethylene oxide polymer product is insoluble; at a temperature below about the melting point of said granular ethylene oxide polymer; and for a second period of time sufficient to produce said granular ethylene oxide polymer as a slurry in said first diluent; the improvement which comprises contacting (a) said slurry of granular olefin oxide polymer; with (b) a second inert, normally-liquid organic diluent (i) which is non-solvent for said granular olefin oxide polymer, (ii) which has a boiling point higher than said first diluent, (iii) which is composed of carbon, hydrogen, and oxygen atoms, said atoms being of the group consisting of alcoholic hydroxylic oxygen, aliphatic etheric oxygen, and mixtures thereof, and (iv) which is selected from three group consisting of propylene glycol, 1,3-butylene glycol, 1,4-butylene glycol, 1,6-hexylene glycol, ethylene glycol, 2-methylpentane-2,4-diol, octane-1,2-diol, dodecanediol, diethylene glycol, dipropylene glycol, dibutylene glycol, glycerol, erythritol, pentaerythritol, 1,1,1-trimethylolethane, 1,1,1-trimethylolpropane, polyoxyethylene glycols, polyoxypropylene glycols, mixed polyoxymethylene-oxypropylene glycols, mono-lower alkyl ethers of ethylene glycol, propylene glycol, butylene glycol, diethylene glycol, dipropylene glycol, dibutylene glycol, polyoxethylene glycols, and polypropylene glycols, di-lower alkyl ethers of ethylene glycol, propylene glycol, butylene glycol, diethylene glycol, dipropylene glycol, dibutylene glycol, polyoxethylene glycols, and polypropylene glycols; and (c) a suspending agent which is non-reactive with said ethylene oxide polymer, said first diluent, and said second diluent; (d) under agitation which is sufficient to provide a shear stress of at least 10 dynes/centimeter$^2$ and in which said oxide polymer is intimately contracted with said diluent; and (e) recovering a stable dispersion comprising particulate ethylene oxide polymer and suspending agent in said diluent.

6. The process of claim 5 wherein said second diluent is propylene glycol and wherein said suspending agent is silica.

7. The process of claim 6 wherein said slurry comprises from about 2 to about 98 weight percent granular ethylene oxide polymer, based on the total weight of said polymer and said first hydrocarbon diluent.

\* \* \* \* \*